(12) United States Patent
Kitamura

(10) Patent No.: US 6,231,252 B1
(45) Date of Patent: May 15, 2001

(54) CHARACTER INPUT SYSTEM AND METHOD USING KEYBOARD

(75) Inventor: Takuo Kitamura, Nissin (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/411,255

(22) Filed: Oct. 4, 1999

(30) Foreign Application Priority Data

Oct. 5, 1998 (JP) .................................................. 10-282359
Nov. 17, 1998 (JP) .................................................. 10-326555

(51) Int. Cl.$^7$ ....................................................... B41J 5/10

(52) U.S. Cl. .......................... 400/484; 400/485; 400/109; 400/110

(58) Field of Search .................................... 400/109, 110, 400/484, 485; 341/22, 28

(56) References Cited

U.S. PATENT DOCUMENTS

| | | | |
|---|---|---|---|
| 3,945,482 | * | 3/1976 | Einbinder ............................. 400/484 |
| 4,310,254 | * | 1/1982 | D'Angiolillo et al. .............. 400/109 |
| 4,375,922 | * | 3/1983 | Maegawa et al. ................... 400/110 |
| 4,543,631 | * | 9/1985 | Kurosu et al. ....................... 400/110 |
| 4,544,276 | * | 10/1985 | Horodeck ............................. 400/484 |
| 4,737,040 | * | 4/1988 | Moon .................................. 400/110 |
| 5,861,821 | * | 1/1999 | Kato et al. ............................. 341/22 |
| 5,936,536 | * | 8/1999 | Sakita .................................... 341/28 |

FOREIGN PATENT DOCUMENTS

| | | | |
|---|---|---|---|
| 5-216575 | | 8/1993 | (JP) . |
| 6-102979 | | 4/1994 | (JP) . |
| WO8200442 | * | 2/1982 | (WO) ................................. 400/484 |

OTHER PUBLICATIONS

M. Morita, "This is the keyboard optimum to the Japanese Language", Company of Japanese Newspaper of Economy, Mar. 25, 1992.

Shimaoka et al, "Sunshine English Course", Program 1 to Program 10, Dec. 5, 1996.

* cited by examiner

*Primary Examiner*—Eugene Eickholt
(74) *Attorney, Agent, or Firm*—Sughrue, Mion, Zinn, Macpeak & Seas, PLLC

(57) ABSTRACT

A character input system (and method) is actualized using an "easy-to-operate" keyboard, which is downsized by reducing a number of keys and which has a good efficiency in performance and operation without increasing key-pressing numbers so much. The keyboard contains a first group of keys for inputting five vowel characters of Japanese in roman letters and a second group of keys for inputting consonant characters (and symbols). Herein, the first group of keys are separated in positions from the second group of keys on a panel of the keyboard. Two consonant characters are assigned to each of the keys of the second group in such a way that an unvoiced consonant character is input by a single key-pressing operation while a voiced consonant character is input by a double key-pressing operation. Assignment of the consonant characters to the keys is determined in consideration of appearance frequencies of kana characters in Japanese documents and/or appearance frequencies of alphabetic letters in English documents, for example. A predetermined time is set to distinguish between operations to repeatedly press the same key twice and the double key-pressing operation applied to the key. A δ key is further provided to establish a double key-pressing operation for a key which is previously pressed. Incidentally, the number of the keys can be further reduced by increasing a number of characters being applied to each of the keys. To selectively input each character, there are further provided two combination keys, i.e., * key and # key.

10 Claims, 11 Drawing Sheets

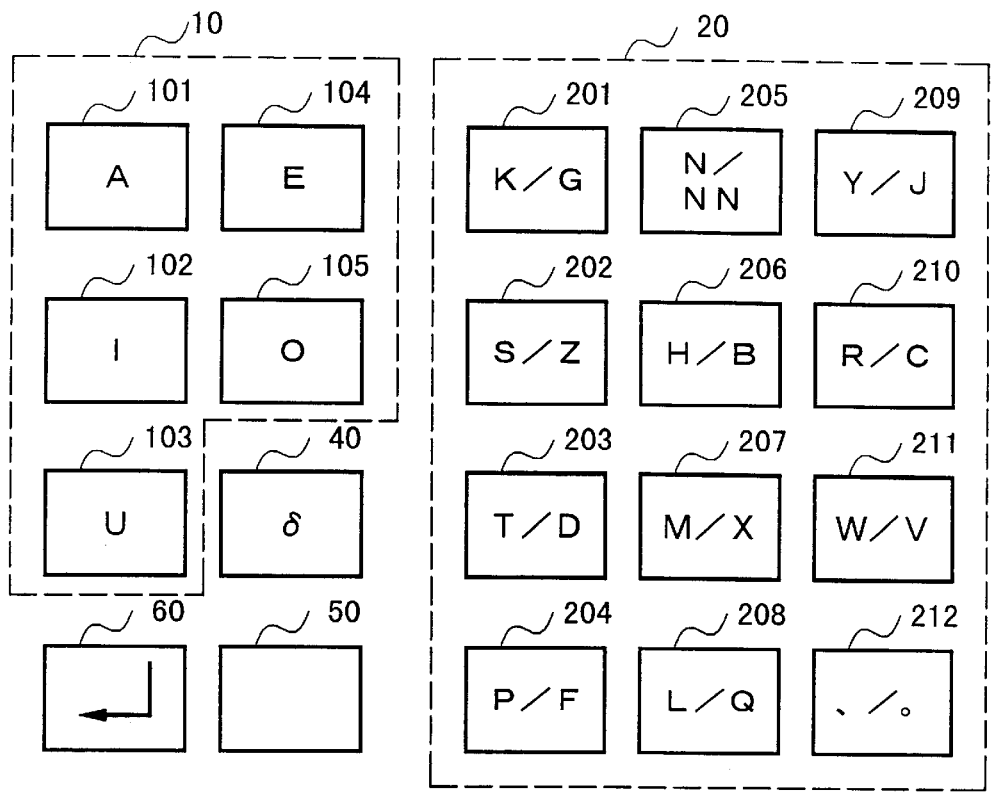

| KEY | CODE DATA |
|---|---|
| A | 0 0 0 0 0 |
| I | 0 0 0 0 1 |
| U | 0 0 0 1 0 |
| E | 0 0 0 1 1 |
| O | 0 0 1 0 0 |
| SPACE | 0 0 1 0 1 |
| ENTER | 0 0 1 1 0 |
| δ | 0 0 1 1 1 |
| K／G | 0 1 0 0 0 |
| S／Z | 0 1 0 0 1 |
| T／D | 0 1 0 1 0 |
| P／F | 0 1 0 1 1 |
| N／NN | 0 1 1 0 0 |
| H／B | 0 1 1 0 1 |
| M／X | 0 1 1 1 0 |
| L／Q | 0 1 1 1 1 |
| Y／J | 1 0 0 0 0 |
| R／C | 1 0 0 0 1 |
| W／V | 1 0 0 1 0 |
| 、／。 | 1 0 0 1 1 |

FIG.8

| CHARACTER | APPEARANCE FREQUENCY |
|---|---|
| A | 8.5 |
| B | 1.7 |
| C | 2 |
| D | 3.1 |
| E | 11.8 |
| F | 1.8 |
| G | 1.9 |
| H | 4.6 |
| I | 7.6 |
| J | 0.2 |
| K | 1.8 |
| L | 5 |
| M | 2.4 |
| N | 6.8 |
| O | 9.2 |
| P | 1.5 |
| Q | 0.1 |
| R | 5.2 |
| S | 6.2 |
| T | 8.2 |
| U | 3.5 |
| V | 0.8 |
| W | 2.8 |
| X | 0.1 |
| Y | 3 |
| Z | 0.2 |

FIG.9

| COMPARISON IN KEY-PRESSING NUMBER | JAPANESE | ENGLISH |
|---|---|---|
| QWERTY | 1 | 1 |
| EMBODIMENT 1 | 1.06 | 1.12 |
| EMBODIMENT 2 | 1.11 | 1.11 |

| COMPARISON IN KEY-PRESSING NUMBER | JAPANESE | ENGLISH |
|---|---|---|
| QWERTY | 1 | 1 |
| EMBODIMENT 5 | 1.14 | 1.32 |
| EMBODIMENT 6 | 1.39 | 1.69 |

CHARACTER INPUT SYSTEM AND METHOD USING KEYBOARD

BACKGROUND OF THE INVENTION

1. Field of the Invention

This invention relates to systems and methods for inputting characters using keyboards.

This application is based on Patent Application No. Hei 10-282359 and No. Hei 10-326555 both filed in Japan, the contents of which are incorporated herein by reference.

2. Description of the Related Art

Conventionally, keyboards are widely used to input character information into electronic digital devices. As the representative of the keyboards, personal computers normally use the so-called "QWERTY" keyboards. The QWERTY keyboard has a relatively large number of keys. Recently, however, it is demanded to cope with downsizing of "portable" (or "handy") digital devices. In order to do so, it is necessary to downsize input devices such as keyboards by reducing a number of keys. In case of portable telephones (or cellular phones), for example, ten keypads originally used for inputting telephone numbers are used to input twenty-six alphabetic letters.

For instance, Japanese Patent Application, First Publication No. Hei 6-102979 discloses a keyboard suited to the downsizing of the digital devices described above.

Now, such a keyboard will be described with reference to FIG. 14.

FIG. 14 is a schematic illustration showing an arrangement of keys of a one-hand keyboard 801. The one-hand keyboard 801 contains fifteen main keys 802, five control keys 803, ten function keys 804 and four cursor keys 805 as well as a kana mode key 806 (where "kana" denotes the Japanese syllabary), a symbol mode key 807, a numeral mode key 808 and a shift key 809. Incidentally, a lamp is turned on when each of the keys 806, 807, 808 and 809 is pressed.

The main keys 802 are used for inputting data into some digital device equipped with the one-hand keyboard 801. The main keys 802 are arranged in a matrix consisting of three rows and five columns. In the main keys 802, five main keys arranged in a middle row are respectively provided for five characters corresponding to five vowels in Japanese, i.e., "A", "I", "U", "E" and "O", while main keys arranged in other rows are respectively provided for ten characters, which correspond to unvoiced consonants and voiced consonants. Four characters corresponding to the voiced consonants are input using a shift function being associated with the corresponding unvoiced consonants. Incidentally, remaining alphabetic characters are input using the shift function. Each voiced consonant can be input by pressing a key of the corresponding unvoiced consonant twice. Thus, the one-hand keyboard 801 actualizes operations to input Japanese characters using roman letters and operations to input alphanumeric characters with high performance.

As shown in FIG. 14, a layout of the keys of the one-hand keyboard 801 is designed such that the control keys 803, function keys 804, cursor keys 805, kana mode key 806, symbol mode key 807, numeral mode key 808 and shift key 809 are arranged in surrounding areas of the main keys 802. Thus, it is possible to actualize functions of the normal keyboard used for data input on the one-hand keyboard 801.

Japanese Patent Application, First Publication No. Hei 5-216575 discloses a keyboard in which an arrangement of consonant keys used for inputting consonant characters is separated from an arrangement of vowel keys for inputting vowel characters in left-right directions while at least two thumb shift keys (i.e., left thumb shift key and right thumb shift key) are arranged at left and right base portions respectively. Using the thumb shift keys, four shift patterns are provided for inputting a consonant character by pressing the corresponding consonant key, as follows:

i) The consonant key being pressed is subjected to shift using the left thumb shift key.

ii) The consonant key is subjected to shift using the right thumb shift key.

iii) The consonant key is subjected to "double" shift by simultaneous depression of the left and right thumb shift keys.

iv) The consonant key is not subjected to shift at all.

Similarly, four shift patterns are provided for inputting a vowel character by pressing the corresponding vowel key. So, there are provided sixteen combinations of shift patters in total due to combinations of the four shift patterns of the consonant key and four shift patterns of the vowel key. Within such sixteen combinations of shift patterns, five combinations of shift patterns are selected and combined with three keys, which correspond to three vowel keys being arranged in three rows respectively. Thus, it is possible to produce fifteen combinations between the shift patterns and keys. Then, a large part of fourteen consonant characters used in the Japanese language and a symbol showing non-existence of the consonant are assigned to the fifteen combinations respectively. Such assignment is commonly accompanied with each vowel key in the same row so as to actualize a complex key. Using such a complex key, two syllables of a Japanese word are simultaneously input. That is, pressing the complex key allows simultaneous input of a vowel character corresponding to an odd-numbered syllable and a consonant character corresponding to a next even-numbed syllable in the Japanese word being input. Thus, it is possible to omit pressing the key for inputting the consonant character corresponding to the even-numbered syllable of the Japanese word.

The aforementioned one-hand keyboard suffers from a problem as follows:

In order to input a voiced consonant character using the one-hand keyboard, it is necessary to repeatedly press the corresponding key twice. So, it is impossible to distinguish between operations to simply input the same character twice and operations to input the voiced consonant character by repeatedly pressing the key twice. Because, the one-hand keyboard lacks a specific function to distinguish between those operations. Another problem is that the one-hand keyboard is not so good in performability. Because, the vowel key adjoins the consonant key.

The aforementioned keyboard using the thumb shift keys suffers from a problem as follows:

It is impossible to produce English documents using such keyboard.

Because, the keyboard does not have keys for inputting letters (e.g., "L"), which are not used to input the Japanese language using the roman letters.

SUMMARY OF THE INVENTION

It is an object of the invention to provide a keyboard, which has a relatively small number of keys with a good efficiency in operation and performance and which is small in size but is easy to operate.

It is another object of the invention to provide a method to input characters using such a keyboard.

It is a further object of the invention to provide media for storing programs actualizing the character input method using the keyboard.

A character input system (and method) of this invention is actualized using an "easy-to-operate" keyboard, which is downsized by reducing a number of keys and which has a good efficiency in performance and operation without increasing key-pressing numbers so much. The keyboard contains a first group of keys for inputting five vowel characters of Japanese (i.e., A, I, U, E and O) in roman letters and a second group of keys for inputting consonant characters (and symbols). Herein, the first group of keys are separated in positions from the second group of keys on a panel of the keyboard. Two consonant characters are assigned to each of the keys of the second group in such a way that an unvoiced consonant character is input by a single key-pressing operation while a voiced consonant character is input by a double key-pressing operation. Assignment of the consonant characters to the keys is determined in consideration of appearance frequencies of kana characters in Japanese documents and/or appearance frequencies of alphabetic letters in English documents, for example.

A predetermined time is set to distinguish between operations to repeatedly press the same key twice and the double key-pressing operation applied to the key. Herein, the predetermined time can be arbitrarily set in response to the skill and operation of the human operator who operates the keyboard. A δ key is further provided to establish a double key-pressing operation for a key which is previously pressed.

The number of the keys can be further reduced by increasing a number of characters being applied to each of the keys. For example, four or more characters selected from among alphanumeric characters and three symbols (such as a comma, a period and a slash) can be assigned to each single key. In that case, there are further provided two combination keys, i.e., * key and # key. So, the characters assigned to each single key are selectively and respectively input by combinations of single and double key-pressing operations applied to each key as well as single and double key-pressing operations applied to each combination key.

BRIEF DESCRIPTION OF THE DRAWINGS

These and other objects, aspects and embodiment of the present invention will be described in more detail with reference to the following drawing figures, of which:

FIG. 1 is a schematic illustration showing an arrangement of keys, which are arranged on a panel of a keyboard in accordance with embodiment 1 of the invention;

FIG. 2 shows a table describing appearance frequencies, which are represented by numbers in percentages with respect to fifteen lines of characters in Japanese language;

FIG. 8 shows appearance frequencies calculated with respect to twenty-six English letters respectively;

FIG. 9 shows a comparison in key-pressing numbers between the QWERTY keyboard and the keyboards of the embodiments 1, 2 with respect to Japanese characters and English characters;

DESCRIPTION OF THE PREFERRED EMBODIMENTS

Figure 3:
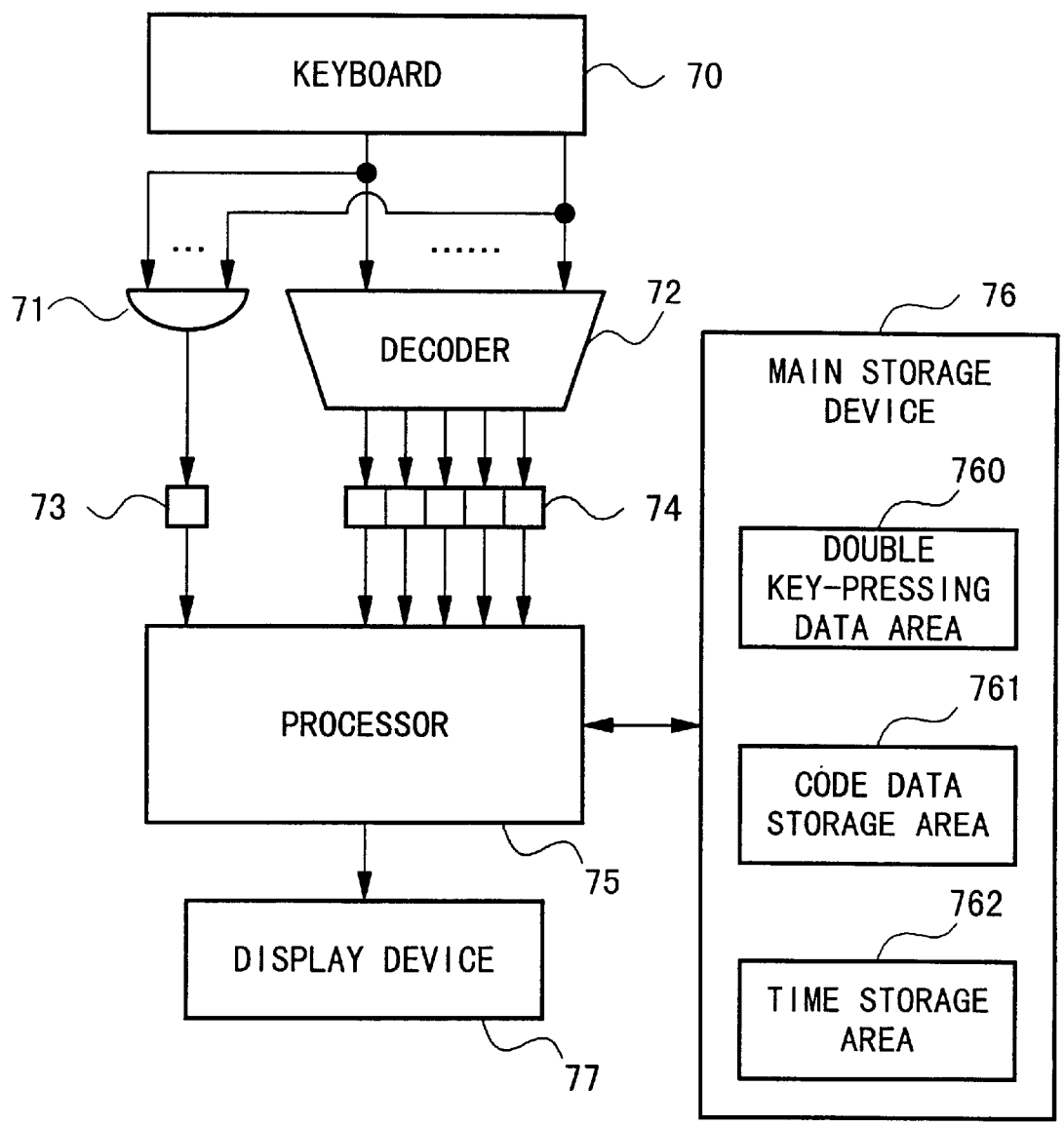
FIG. 3 is a block diagram showing a system configuration for inputting characters using a keyboard in accordance with the present invention.
Figure 4:
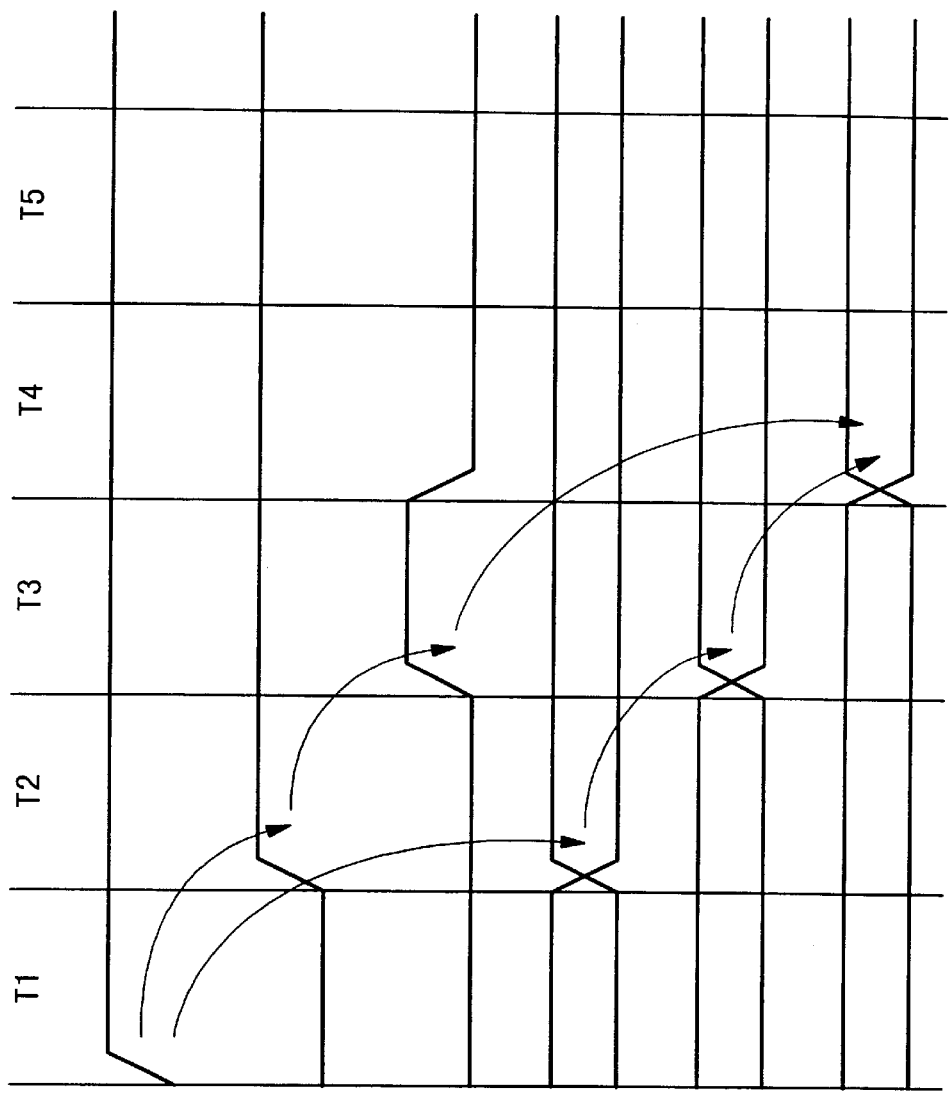
FIG. 4A is a time chart showing an output of a K/G key of the keyboard shown in FIG. 1.
FIG. 4B is a time chart showing an output of an OR circuit shown in FIG. 3.
FIG. 4C is a time chart showing an output of a differentiating circuit shown in FIG. 3.
FIG. 4D is a time chart showing output data of a decoder shown in FIG. 3.
FIG. 4E is a time chart showing output data of a register shown in FIG. 3.
FIG. 4F is a time chart showing output data of a processor shown in FIG. 3.

This invention will be described in further detail by way of examples with reference to the accompanying drawings.

FIG. 1 is a schematic illustration showing an arrangement of keys, which are arranged on a panel of a keyboard in accordance with embodiment 1 of the invention.

The keyboard of FIG. 1 contains a first group of keys "10" and a second group of keys "20" as well as a δ key 40, a space key 50 and an enter key 60.

The first group 10 contains five keys for inputting five vowel characters in Japanese, i.e., an A key 101, an I key 102, a U key 103, an E key 104 and an O key 105. The second group 20 contains eleven keys for inputting consonant characters, i.e., a K/G key 201, a S/Z key 202, a T/D key 203, a P/F key 204, a NINN key 205, a H/B key 206, a M/X key 207, a L/Q key 208, a Y/J key 209, a R/C key 210 and a W/V key 211. In addition, the second group 20 also contains a key 211 for inputting symbols such as a comma 、 and a period 。 in Japanese. Incidentally, each of the consonant keys belonging to the second group 20 is designed to designate two characters, which are separated with a slash "/". Herein, a left character is input by pressing the key once, while a right character is input by pressing the key twice.

Next, a description will be given with respect to reasons why the aforementioned arrangement of keys is suited to a kana/roman-letter input mode in inputting Japanese characters.

In general, Japanese characters are input using kana letters in roman letters, wherein the Japanese syllabary basically consists of fifty kana letters. However, the roman letters used for inputting the kana letters do not need all of twenty-six alphabetic letters. The modern Japanese language normally contains English words. So, people frequently mix Japanese words and letters with the alphabetic letters in inputting the Japanese characters using the keyboard. Therefore, the keyboard should be designed to have a capability of inputting all the twenty-six alphabetic letters. The keyboard of the embodiment 1 is designed to provide an efficient and easy way for the kana/roman-letter input.

Next, a description will be given with respect to an application of the arrangement of the keys of the keyboard, which is determined in consideration of appearance frequencies of kana/roman letters.

The keyboard of the embodiment 1 is suited to the input of Japanese language.

FIG. 2 shows a table describing "average" appearance frequencies of the kana/roman letters in the Japanese language, a source of which is given on page 17 of a book entitled "This is the keyboard optimum to the Japanese language" written by Mr. Masasuke Morita and published by the Nikkei Shinbun Sha (i.e., Company of Japanese Newspaper of Economy) on Mar. 25, 1992.

When inputting the Japanese characters in roman letters, a human operator operates the keyboard to input vowel characters independently and to input character pairs each consisting of a consonant character and a vowel character frequently. For this reason, the vowel characters have great appearance frequencies in the Japanese language. Therefore, the keyboard is designed such that the keys 101–105 for inputting the five vowel characters (i.e., A, I, U, E and O) are arranged collectively as the first group 10.

In general, the Japanese syllabary consists of fifty kana letters, which are classified into ten lines each consisting of five letters in connection with the five vowel characters in Japanese. For example, there are provided a line related to a consonant "K", which includes five K-related letters, i.e., "KA", "KI", "KU", "KE" and "KO", being arranged in connection with the five vowel characters "A", "I", "U", "E" and "O" respectively. Such a line related to the consonant "K" will be referred to as "K line". Similarly, there are provided "S line", "T line", "N line", "H line", "M line", "Y line", "R line" and "W line. Those lines are related to unvoiced consonants K, S, T N, H, M, Y, R and W. In addition, the Japanese language also contains an "A" line (or vowel line) consisting of the five vowel characters and a "P" line consisting of five characters related to a (unvoiced) consonant "P" as well as other four lines using voiced consonants "G", "Z", "D" and "B". So, the Japanese language also contains "G line", "Z line", "D line" and "B line", which are related to the voiced consonants respectively. For this reason, the table of FIG. 2 shows the appearance frequencies with respect to fifteen lines in total. With reference to the table of FIG. 2, the vowel line and the lines related to the unvoiced consonants have greater appearance frequencies than the lines related to the voiced consonants. Herein, the table shows fifteen appearance frequencies in percentages. A total of the fifteen appearance frequencies is 100%, wherein the A line has 35% while the other lines have 65% in total.

In consideration of the aforementioned appearance frequencies, the keys 201–209 used for inputting the consonant characters are arranged collectively in the second group 20. So, the keyboard is designed such that each of unvoiced-consonant characters is input by pressing the corresponding key once while each of voiced-consonant characters is input by pressing the corresponding key twice.

Incidentally, the keyboard employs a specific key assignment, according to which a pair of an unvoiced consonant and its related voiced consonant are assigned to a same single key. For example, the unvoiced-consonant character "K" and its related voiced-consonant character "G" are assigned to a same single key, i.e., K/G key 201. Similarly, there are provided the S/Z key 202, T/D key 203 and H/B key 206, for example.

In addition, the unvoiced-consonant characters which do not have related voiced-consonant characters in roman letters are treated as characters, each of which is input by pressing the corresponding key twice. That is, such unvoiced-consonant characters are subjected to key assignment in which each of them is paired with each of specific alphabetic letters which are not contained in the roman letters used for the Japanese language. For example, the (unvoiced) consonant character "P" is paired with an alphabetic letter "F" on a same single key, i.e., P/F key 204. Similarly, there are provided the M/X key 207, Y/J key 209, R/C key 210 and W/V key 211.

In order to allow inputting all the twenty-six alphabetic letters, it is necessary to provide a key for inputting "L" and "Q", i.e., the L/Q key 208. Herein, "L" is input by pressing the key once, while "Q" is input by pressing the key twice.

Further, an unvoiced character "N" which is used to input characters belonging to the N line is paired with "NN", which represents a special single character ん (pronounced as "N") in the Japanese language being expressed in roman letters. They are assigned to a same single key, i.e., N/NN key 205. Furthermore, characters representing contracted sounds are input by pressing a number of keys. For example, a contracted sound きゃ (pronounced as "kya") in Japanese expressed in roman letters is input by pressing three keys representing three letters, i.e., "K", "Y" and "A". A double consonant (i.e., っ) is input by pressing three keys representing three letters "L", "T" and "U", for example. Moreover, a comma 、 in Japanese is paired with a period 。 in Japanese on the key 212. Herein, the comma is input by pressing the key once, while the period is input by pressing the key twice.

Incidentally, the keyboard of FIG. 1 contains the space key 50 for inputting a space and the enter key 60 in addition to the aforementioned keys belonging to the first group 10 and the second group 20.

Next, a description will be given with respect to a distinction between a single key-pressing operation for pressing a key once and a double key-pressing operation for repeatedly pressing a key twice.

The system of the present invention makes a decision that an operation to repeatedly press a consonant key, which has been already pressed once, within a prescribed period of time is related to a double key-pressing operation by which the consonant key is repeatedly pressed twice. So, the system distinguishes such a double key-pressing operation from a single key-pressing operation in which the consonant key is merely pressed once. Herein, the single key-pressing operation of the consonant key can be also defined as an operation in which another key is pressed after the consonant key is pressed or an operation in which the same consonant key is pressed again after the prescribed period of time being elapsed from the timing when the consonant key is pressed. A timer is used to set the prescribed period of time, which can be set in accordance with characteristics of human operators who operate the keyboard. This allows a rhythmical input which matches with a rhythm of the human operator who operates the keyboard to input data.

The δ key 40 is provided for human operators who are not good at the aforementioned rhythmical input. That is, the present system regards an operation in which the human operator presses the δ key 40 continuously after pressing the consonant key as a double key-pressing operation of the consonant key. So, the human operator is capable of inputting a desired character without repeatedly pressing the same consonant key within the prescribed period of time.

For example, a character "G" can be input by pressing the K/G key 201 and the δ key 40 sequentially.

The above is the description which is made with respect to character input operations using the keyboard, which is constructed electronically and mechanically. Of course, the present embodiment can be applied to other character input operations, which are performed on a "virtual" keyboard displayed on a screen of a display by software.

Next, descriptions will be given with respect to a configuration and operations of the present embodiment with reference to FIGS. 3 to 6.

Figure 5:
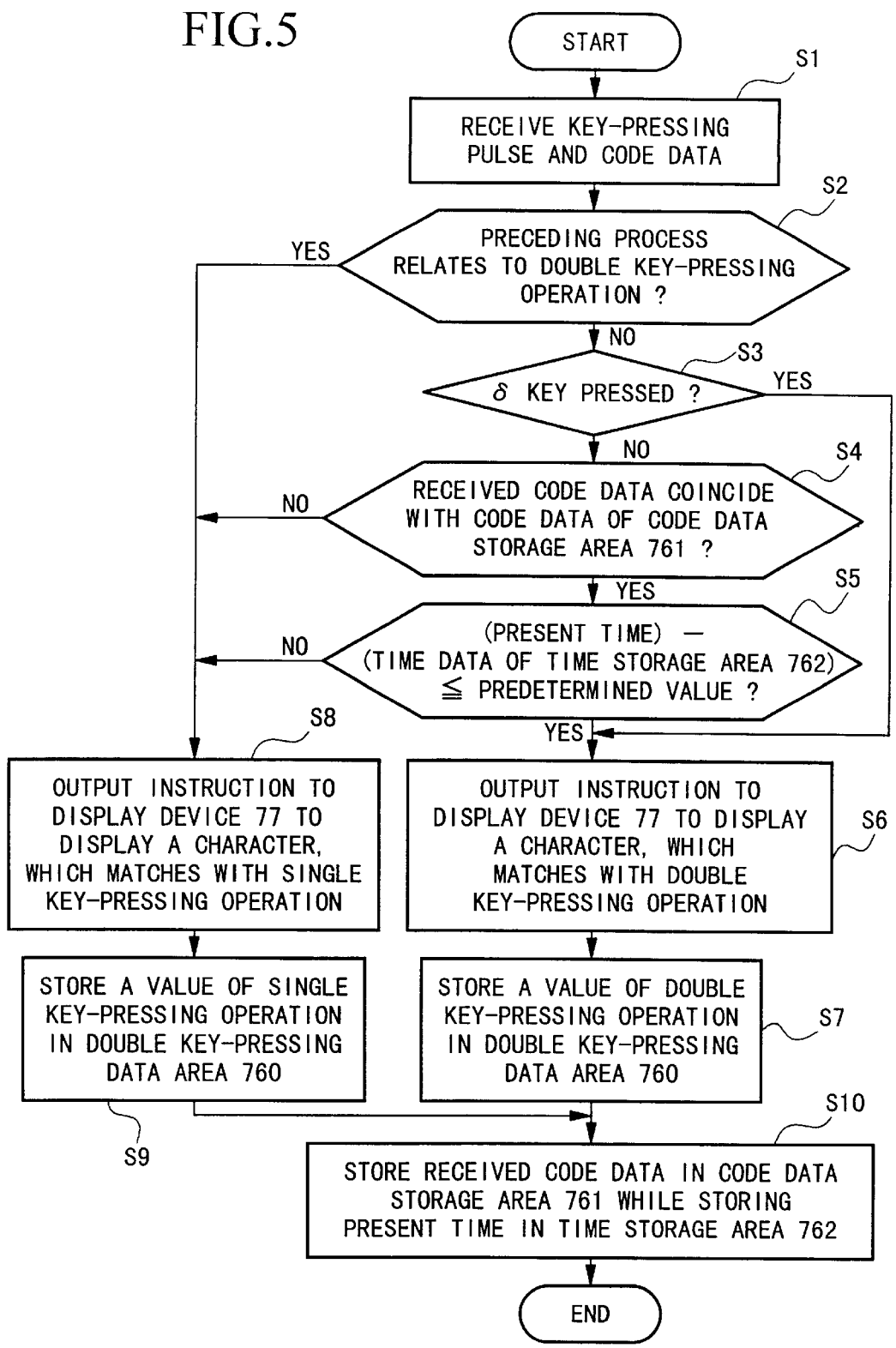
FIG. 5 is a flowchart showing operations of the processor.
Figures 6, 7:
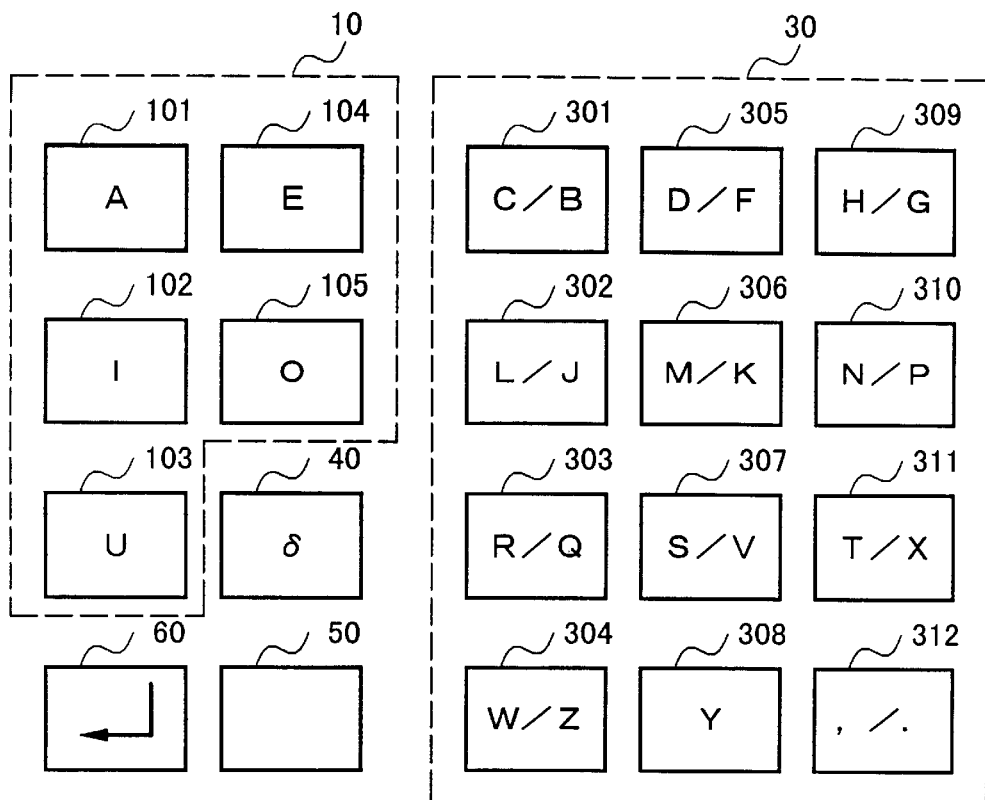
FIG. 6 shows relationships between keys and code data output from the decoder.
FIG. 7 is a schematic illustration showing an arrangement of keys of a keyboard in accordance with embodiment 2 of the invention.

Specifically, FIG. 3 is a block diagram showing a hardware configuration of a system using the aforementioned keyboard in accordance with the embodiment 1 of the invention. FIGS. 4A to 4F are time charts showing signals and data, which emerge in the system of FIG. 3. FIG. 5 is a flowchart showing operations of the system. FIG. 6 shows content of code data used by the system.

With reference to FIG. 3, the present system is configured by a keyboard 70 (whose arrangement of keys is shown in FIG. 1), an OR circuit 71, a decoder 72, a differentiating circuit 73, a register 74, a processor 75, a main storage device 76 and a display device 77. All of outputs of the keys of the keyboard 70 (see FIG. 1) are input to the OR circuit 71 and the decoder 72 respectively. An output of the OR circuit 71 is input to the differentiating circuit 73. Outputs of the decoder 72 are input to the register 74. An output of the differentiating circuit 73 and outputs of the register 74 are input to the processor 75. The processor 75 is equipped with the main storage device 76. Under the control of the processor 75, characters are displayed on a screen of the display device 77.

The main storage device 76 contains a double key-pressing data area 760, a code data storage area 761 and a time storage area 762.

Now, suppose that the human operator presses the K/G key 201 on the keyboard 70 in a cycle T1, which is shown in FIG. 4A. In a cycle T2, the OR circuit 71 produces a logical sum of outputs of all keys of the keyboard 70, which is shown in FIG. 4B. In this case, "1" is set to an output of the K/G key 201 only, so the OR circuit 71 correspondingly outputs "1" in the cycle T2.

The decoder 72 converts the outputs of all keys of the keyboard 70 to codes, which are output as code data in the cycle T2 (see FIG. 4D). Herein, the code data consist of five bits as shown in FIG. 6, for example. When the human operator presses the K/G key 201, the decoder 72 outputs 5-bit code data, which correspond to "01000".

The differentiating circuit 73 differentiates the output of the OR ircuit 71 to output a key-pressing pulse in a cycle T3 (see FIG. 4C), which represents an event that the human operator presses a key. The register 74 inputs the code data output from the decoder 72. Then, the register 74 outputs the code data in the cycle T3 (see FIG. 4E) in synchronization with the key-pressing pulse.

Then, the processor 75 inputs the key-pressing pulse of the differentiating circuit 73 and the code data of the register 74 in a cycle T4, which is shown in FIG. 4F.

Next, a description will be given with respect to operations of the processor 75 with reference to FIG. 5.

In step S1 shown in FIG. 5, the processor 75 simultaneously receives the key-pressing pulse of the differentiating circuit 73 and the code data of the register 74. The processor 75 reads double key-pressing data, regarding a preceding process thereof, from the double key-pressing data area 760 in the main storage device 76. In step S2, the processor 75 makes a decision based on the double key-pressing data as to whether the preceding process is related to a double key-pressing operation or not. If the preceding process is not related to the double key-pressing operation, in other words, the decision of step S2 results in "NO", the processor 75 proceeds to step S3. In step S3, the processor 75 makes a decision as to whether the code data presently received represent a key-pressing operation of the δ key 40 or not.

If the code data do not represent the key-pressing operation of the δ key 40, in other words, when a decision result of the step S3 is "NO", the system proceeds to step S4. In step S4, the processor 75 compares the code data presently received with code data regarding the preceding process, which are stored in the code data storage area 761. If those code data coincide with each other, in other words, when a decision result of the step S4 is "YES", the processor 75 proceeds to step S5. In step S5, the processor 75 compares a present time with time data regarding the preceding process, which are stored in the time storage area 762.

If a difference between the present time and time data is under a predetermined value, in other words, when a decision result of the step S5 is "YES", the processor 75 proceeds to step S6. In addition, the processor transfers control to step S6 when in the step S3, the code data represent the key-pressing operation of the δ key 40, i.e., when the decision result of the step S3 is "YES". In step S6, the processor 75 outputs an instruction to the display device 77 to display a character, which matches with a double key-pressing operation, on the screen. In the case where the code data correspond to "01000" representing the K/G key 201, for example, the display device 77 displays a character "G", which matches with a double key-pressing operation of the K/G key 201, on the screen. Next, in step S7, the processor 75 stores a value corresponding to the double key-pressing operation in the double key-pressing data area 760 of the main storage device 76 as double key-pressing data. After completion of the step S7, the processor 75 proceeds to step S10 in which the processor 75 stores the code data presently received in the code data storage area 761 of the main storage device 76 while also storing a present time in the time storage area 762 of the main storage device 76 as time data.

If the preceding process of the processor 75 relates to the double key-pressing operation, in other words, when the decision result of the step S2 is "YES", the processor 75 transfers control to step S8. In addition, if the code data presently received do not coincide with the code data stored in the code data storage area 761, in other words, when the decision result of the step S4 is "NO", the processor 75 transfers control to step S8. Further, if the difference between the present time and time data is greater than the predetermined value, in other words, when the decision result of the step S5 is "NO", the processor 75 proceeds to step S8.

In step S8, the processor 75 outputs an instruction to the display device 77 to display a character, which matches with a single key-pressing operation of the code data presently received, on the screen. In the case where the code data correspond to "01000" representing the K/G key 201, the display device 77 displays a character "K" on the screen. After completion of the step S8, the processor 75 proceeds to step S9 in which a value representing the single key-pressing operation is stored in the double key-pressing data area 760 of the main storage device 76 as double key-pressing data. Thereafter, the processor 75 transfers control to step S10. In step S10, the processor 75 stores the code data presently received in the code data storage area 761 of the main storage device 76 while storing a present time in the time storage area 762 of the main storage device 762 as time data.

Incidentally, the human operator is capable of storing the predetermined value, used for distinguishing between the single key-pressing operation and double key-pressing operation, in the processor 75 by operating the keyboard 70. Thus, it is possible to set the predetermined time at a value which is suited to the skill and operation of the human operator.

Next, a description will be given with respect to a keyboard in accordance with embodiment 2 of the invention. FIG. 7 is a schematic illustration showing an arrangement of keys of the keyboard in accordance with the embodiment 2 of the invention, wherein parts equivalent to those shown in FIG. 1 are designated by the same reference symbols.

With reference to FIG. 7, the keyboard of the embodiment 2 is constructed using a third group of keys "30" in addition to the aforementioned first group of keys "10", δ key 40, space key 50 and enter key 60.

Like the aforementioned embodiment 1 shown in FIG. 1, the keyboard of the embodiment 2 employs the first group 10, which consists of the five vowel keys 101 to 105. The third group 30 includes a number of consonant keys. That is, the third group 30 contains a C/B key 301, a L/J key 302, a R/Q key 303, a W/Z key 304, a D/F key 305, a M/K key 306, a S/V key 307, a Y key 308, a H/G key 309, a N/P key 310 and a T/X key 311. In addition, the third group 30 also contains a ",/." key 312 for inputting a comma and a period in English.

Next, a description will be given with respect to an application of the arrangement of the keys of the keyboard, which is determined in consideration of appearance frequencies of alphabetic letters of the English language.

FIG. 8 shows appearance frequencies which are calculated with respect to twenty-six English letters by way of samples of English words listed on first pages of PROGRAM 1 to PROGRAM 10 of a text book entitled "SUNSHINE ENGLISH COURSE" (e.g., second and fourth editions) written by Shimaoka and other members and published by Kai-Ryu-Do Shuppan Kabushiki Kaisha (on Dec. 5, 1996).

With reference to FIG. 8, five vowel characters have great appearance frequencies, wherein "A" has an appearance frequency of 8.5%, "I" 7.6%, "U" 3.5%, "E" 11.8% and "O" 9.2%. For this reason, the five vowel keys 101–105 for inputting the five vowel characters are arranged collectively as the first group 10.

In addition, the English letters include eleven characters each having a relatively high appearance frequency, i.e., T, N, S, R, L, H, D, Y, W, M and C. So, those eleven characters are set as characters, each of which is input by a single key-pressing operation.

Then, remaining characters (i.e., B, F, G, J, K, P, Q, V, X and Z) are arranged in a alphabetic order and are set as characters, each of which is input by a double key-pressing operation. The characters related to the single key-pressing operations are paired with the characters related to the double key-pressing operations. Then, pairs of those characters are arranged and assigned to keys in a alphabetic order. Thus, it is possible to actualize the keys 301–307 and 309–311. That is, C is paired with B, while D is paired with F, for example.

Operations of the system using the keyboard of the embodiment 2 are basically similar to the aforementioned operations of the system using the keyboard of the embodiment 1. Differences between the embodiments 1 and 2 lie in arrangement and assignment of the characters of the keys. So, the aforementioned system is partially modified such that the processor 75 recognizes such arrangement and assignment of the characters of the keys, so that the system of the embodiment 2 is capable of operating as similar to the foregoing system of the embodiment 1.

Next, a description will be given with respect to numbers of operations to press the keys (hereinafter, simply referred to as key-pressing numbers) in the keyboards of the embodiments 1 and 2. FIG. 9 shows a comparison in key-pressing numbers between the QWERTY keyboard and the keyboards of the embodiments 1 and 2 with respect to Japanese and English.

First, a description will be given with respect to operations to input Japanese characters.

With reference to FIG. 2, K line has an appearance frequency whose value in percentage is "11". With respect to "K" being input using the keyboards respectively, key-pressing numbers are calculated using the above value "11" as follows:

As for the QWERTY keyboard which inputs "K" by applying a single key-pressing operation to the corresponding key, a key-pressing number is given by 1×11=11. As for the keyboard of the embodiment 1 which inputs "K" by applying a single key-pressing operation to the K/G key 201, a key-pressing number is given by 1×11=11. As for the keyboard of the embodiment 2 which inputs "K" by applying a double key-pressing operation to the M/K key 306, a key-pressing number is given by 2×11=22.

In addition, S line has an appearance frequency whose value is "9". With respect to "S" being input using the keyboards, key-pressing numbers are calculated using the above value "9" as follows:

As for the QWERTY keyboard which inputs "S" by a single key-pressing operation, a key-pressing number is given by 1×9=9. As for the keyboard of the embodiment 1 which inputs "S" by applying a single key-pressing operation to the S/Z key 202, a key-pressing number is given by 1×9=9. As for the keyboard of the embodiment 2 which inputs "S" by applying a single key-pressing operation to the S/V key 307, a key-pressing number is given by 1×9=9.

Further, D line has an appearance frequency whose value is "3". With respect to "D" being input using the keyboards, key-pressing numbers are calculated using the above value "3" as follows:

As for the QVVERTY keyboard which inputs "D" by a single key-pressing operation, a key-pressing number is given by 1×3=3. As for the keyboard of the embodiment 1 which inputs "D" by applying a double key-pressing operation to the T/D key 203, a key-pressing number is given by 2×3=6. As for the keyboard of the embodiment 2 which inputs "D" by applying a single key-pressing operation to the D/F key 305, a key-pressing number is given by 1×3=3.

The five vowel characters "A", "I", "U", "E" and "O" are input with respect to all the lines of the "kana" characters in Japanese. So, each of the vowel characters has an appearance frequency whose value is "100". With respect to each vowel character being input using the keyboards, key-pressing numbers are calculated as follows:

As for the QWERTY keyboard which inputs each vowel character by a single key-pressing operation, a key-pressing number is given by 1×100=100. As for the keyboard of the embodiment 1 which inputs each vowel character by a single key-pressing operation, a key-pressing number is given by 1×100=100. As for the keyboard of the embodiment 2 which inputs each vowel character by a single key-pressing operation, a key-pressing number is given by 1×100=100.

As described above, key-pressing numbers are respectively calculated with respect to a number of lines of the kana characters in Japanese. Then, those numbers are added together as follows:

As for the QWERTY keyboard, the key-pressing numbers are added together as 11+9+ . . . 3+ . . . +100=165. As for the keyboard of the embodiment 1, a total of the key-pressing numbers is given by 11+9+ . . . 6+ . . . +100=175. As for the keyboard of the embodiment 2, a total of the key-pressing numbers is given by 22+9+ . . . 3+ . . . +100=183.

Using the above numbers, it is possible to calculate a ratio in the total of the key-pressing numbers with respect to each of the embodiments 1 and 2 as compared with the QWERTY keyboard. Results are shown in FIG. 9, wherein the ratios are calculated as follows:

As for the embodiment 1 as compared with the QWERTY keyboard, a ratio is given by 175/165=1.06. As for the embodiment 2 as compared with the QWERTY keyboard, a ratio is given by 183/165=1.11.

Next, a description will be given with respect to operations to input English characters.

With reference to FIG. 8, "A" has an appearance frequency whose value is "8.5". With respect to "A" being input using the keyboards respectively, key-pressing numbers are calculated using the above value "8.5" as follows:

As for the QWERTY keyboard which inputs "A" by a single key-pressing operation, a key-pressing number is given by 1×8.5=8.5. As for the keyboard of the embodiment 1 which inputs "A" by applying a single key-pressing operation to the A key 101, a key-pressing number is given by 1×8.5=8.5. As for the keyboard of the embodiment 2 which inputs "A" by applying a single key-pressing operation to the A key 101, a key-pressing number is given by 1×8.5=8.5.

In addition, "C" has an appearance frequency whose value is "2". With respect to "C" being input using the keyboards, key-pressing numbers are calculated using the above value "2" as follows:

As for the QWERTY keyboard which inputs "C" by a single key-pressing operation, a key-pressing number is given by 1×2=2. As for the keyboard of the embodiment 1 which inputs "C" by applying a double key-pressing operation to the R/C key 210, a key-pressing number is given by 2×2=4. As for the keyboard of the embodiment 2 which inputs "C" by applying a single key-pressing operation to the C/B key 301, a key-pressing number is given by 1×2=2.

Further, "P" has an appearance frequency whose value is "1.5". With reference to "P" being input using the keyboards, key-pressing numbers are calculated using the above value "1.5" as follows:

As for the QWERTY keyboard which inputs "P" by a single key-pressing operation, a key-pressing number is given by 1×1.5=1.5. As for the keyboard of the embodiment 1 which inputs "P" by applying a single key-pressing operation to the P/F key 204, a key-pressing number is given by 1×1.5=1.5. As for the keyboard of the embodiment 2 which inputs "P" by applying a double key-pressing operation to the N/P key 310, a key-pressing number is given by 2×1.5=3.

Thus, the key-pressing numbers are respectively calculated with respect to the English characters. Then, those numbers are added together as follows:

As for the QWERTY keyboard, a total of the key-pressing numbers is given by 8.5+ . . . +2+ . . . +1.5+ . . . =100. As for the keyboard of the embodiment 1, a total of the key-pressing numbers is given by 8.5+ . . . +4+ . . . +1.5 . . . =111.9. As for the keyboard of the embodiment 2, a total of the key-pressing numbers is given by 8.5+ . . . +2+ . . . +3+ . . . =110.9.

Using the above numbers, it is possible to calculate a ratio in the total of the key-pressing numbers with respect to each of the embodiments 1 and 2 as compared with the QWERTY keyboard. Results are shown in FIG. 9, wherein the ratios are calculated as follows:

As for the embodiment 1 as compared with the QWERTY keyboard, a ratio is given by 111.9/100=1.12. As for the embodiment 2 as compared with the QWERTY keyboard, a ratio is given by 110.9/100=1.11.

Next, a description will be given with respect to a character input method using the keyboard in accordance with embodiment 3 of the invention.

The character input method is made using the aforementioned steps shown in FIG. 5. Namely, the character input method contains the steps as follows:

S1: a first step for simultaneously receiving a key-pressing pulse of the differentiating circuit 73 and code data of the register 74.

S2: a second step for reading double key-pressing data, regarding the preceding process, from the double key-pressing data area 760 of the main storage device 76 so as to make a decision as to whether the data of the preceding process correspond to a value representing a double key-pressing operation or not.

S3: a third step for if the aforementioned decision indicates that the preceding process is not related to the double key-pressing operation (in other words, if the decision result of the step S2 is "NO"), making a decision as to whether the code data presently received represents a key-pressing operation of the δ key 40 or not.

S4: a fourth step for if the code data do not represent the key-pressing operation of the δ key 40 (in other words, if the decision result of the step S3 is "NO"), comparing the code data presently received with code data regarding the preceding process which are stored in the code data storage area 761 of the main storage device 76.

S5: a fifth step for if the code data coincide with each other (in other words, if the decision result of the step S4 is "YES") comparing a present time with time data regarding the preceding process which are stored in the time storage area 762 of the main storage device 76.

S6: a sixth step for if a difference between the present time and time data is under a predetermined value (in other words, if the decision result of the step S5 is "YES") or if the code data represent the key-pressing operation of the δ key 40 (in other words, if the decision result of the step S3 is "YES"), outputting an instruction to the display device 77 to display a character, which matches with the double key-pressing operation, on the screen.

S7: a seventh step for storing a value representing the double key-pressing operation in the double key-pressing data area 760 of the main storage device 76 as double key-pressing data.

S8: an eighth step for if the preceding process is related to the double key-pressing operation (in other words, if the decision result of the step S2 is "YES"), if the code data do not coincide with each other (in other words, if the decision result of the step S4 is "NO") or if the difference between the present time and time data is greater than the predetermined value (in other words, if the decision result of the step S5 is "NO"), outputting an instruction to the display device 77 to display a character, which matches with a single key-pressing operation with respect to the code data presently received, on the screen.

S9: a ninth step for storing a value representing the single key-pressing operation in the double key-pressing data area 760 of the main storage device 76 as double key-pressing data.

S10: a tenth step for storing the code data presently received in the code data storage area 761 of the main storage device 76 while also storing the present time in the time storage area 762 of the main storage device 76 as time data.

Figure 10:
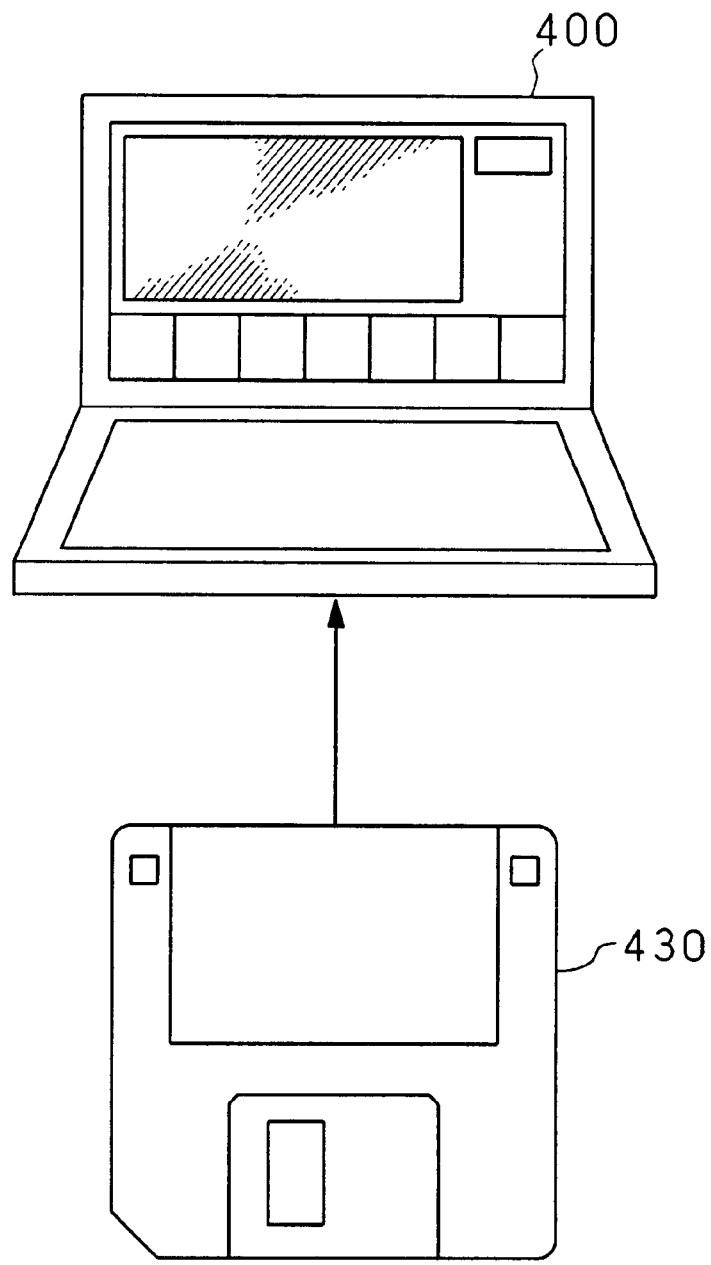
FIG. 10 is a schematic illustration showing an outline of a system in accordance with embodiment 4 of the invention.

Next, a description will be given with respect to a system in accordance with embodiment 4 of the invention. FIG. 10 is a schematic illustration showing an outline of the system of the embodiment 4.

With reference to FIG. 10, the embodiment 4 is actualized using a storage medium 430 which stores a program being executed by a electronic device 400 equipped with a cellular phone (not shown), wherein the program contains the aforementioned steps of the character input method of the embodiment 3. The program stored on the storage medium 430 is loaded to a storage device (not shown) of the electronic device 400, in which it is executed by the foregoing processor 75, for example.

Specifically, the embodiment 4 is actualized by the storage medium 430 storing the program for controlling the electronic device 400 to execute ten steps as follows:

S1: a first step for simultaneously receiving a key-pressing pulse of the differentiating circuit 73 and code data of the register 74.

S2: a second step for reading double key-pressing data, regarding the preceding process, from the double key-pressing data area 760 of the main storage device 76 so as to make a decision as to whether the data of the preceding process correspond to a value representing a double key-pressing operation or not.

S3: a third step for if the aforementioned decision indicates that the preceding process is not related to the double key-pressing operation (in other words, if the decision result of the step S2 is "NO"), making a decision as to whether the code data presently received represents a key-pressing operation of the δ key 40 or not.

S4: a fourth step for if the code data do not represent the key-pressing operation of the δ key 40 (in other words, if the decision result of the step S3 is "NO"), comparing the code data presently received with code data regarding the preceding process which are stored in the code data storage area 761 of the main storage device 76.

S5: a fifth step for if the code data coincide with each other (in other words, if the decision result of the step S4 is "YES") comparing a present time with time data regarding the preceding process which are stored in the time storage area 762 of the main storage device 76.

S6: a sixth step for if a difference between the present time and time data is under a predetermined value (in other words, if the decision result of the step S5 is "YES") or if the code data represent the key-pressing operation of the δ key 40 (in other words, if the decision result of the step S3 is "YES"), outputting an instruction to the display device 77 to display a character, which matches with the double key-pressing operation, on the screen.

S7: a seventh step for storing a value representing the double key-pressing operation in the double key-pressing data area 760 of the main storage device 76 as double key-pressing data.

S8: an eighth step for if the preceding process is related to the double key-pressing operation (in other words, if the decision result of the step S2 is "YES"), if the code data do not coincide with each other (in other words, if the decision result of the step S4 is "NO") or if the difference between the present time and time data is greater than the predetermined value (in other words, if the decision result of the step S5 is "NO"), outputting an instruction to the display device 77 to display a character, which matches with a single key-pressing operation with respect to the code data presently received, on the screen.

S9: a ninth step for storing a value representing the single key-pressing operation in the double key-pressing data area 760 of the main storage device 76 as double key-pressing data.

S10: a tenth step for storing the code data presently received in the code data storage area 761 of the main storage device 76 while also storing the present time in the time storage area 762 of the main storage device 76 as time data.

In the aforementioned embodiment(s), the δ key 40 has a function by which the system interprets a key-pressing operation of the δ key 40 such that a certain key which has been pressed just before the pressing of the δ key 40 is pressed again as similar to a double key-pressing operation. It is possible to modify the function of the δ key 40 in such a manner that a key-pressing operation of the δ key 40 is regarded as a double key-pressing operation being applied to a certain key which will be pressed just after the pressing of the δ key 40. Due to such modification, the step S3 shown in FIG. 5 should be correspondingly modified such that a decision is made as to whether the δ key 40 has been pressed in the preceding process or not.

Figure 11:
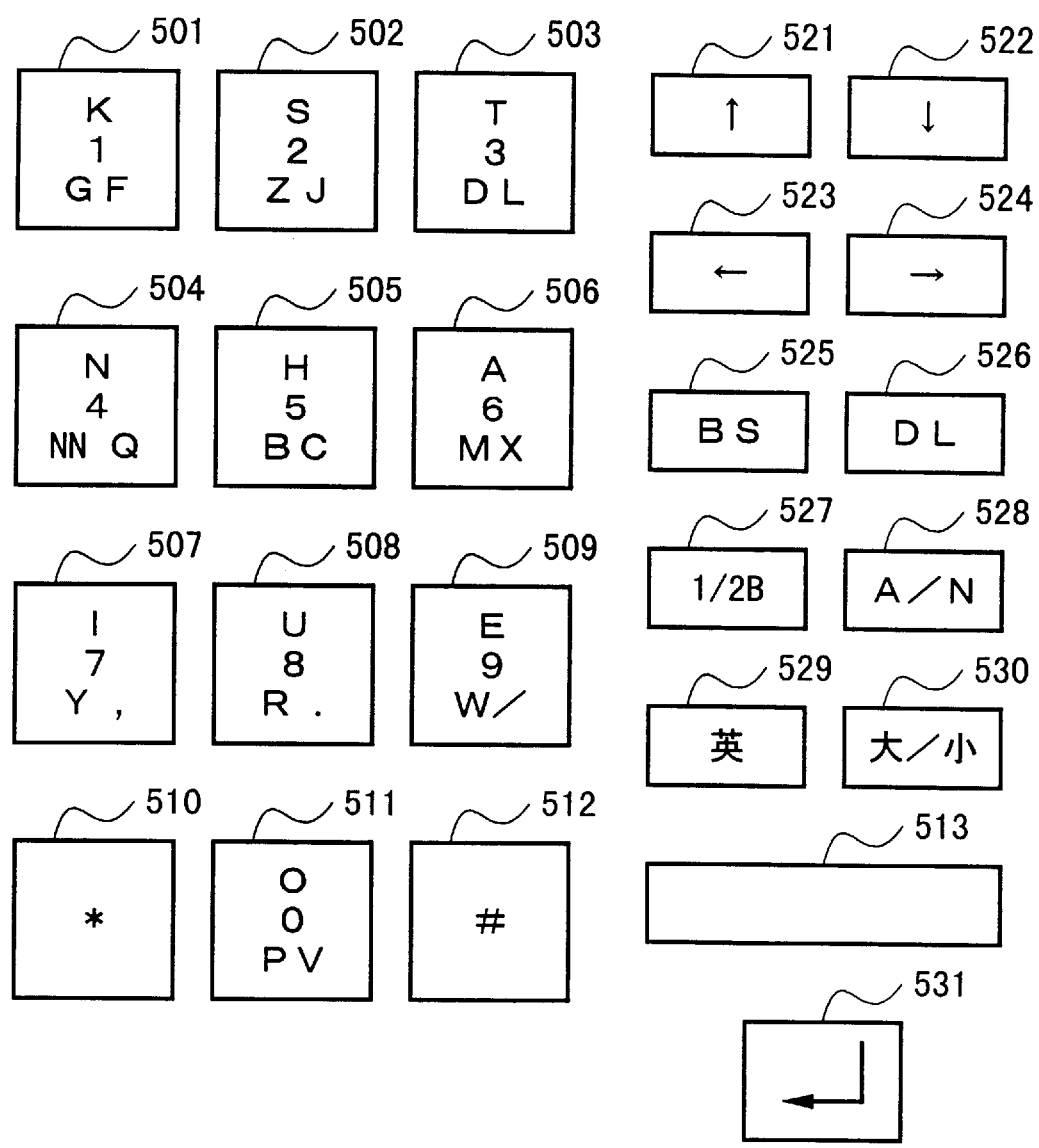
FIG. 11 is a schematic illustration showing an arrangement of keys, which are arranged on a panel of a keyboard in accordance with embodiment 5 of the invention.

Next, a description will be given with respect to a keyboard in accordance with embodiment 5 of the invention. FIG. 11 is a schematic illustration showing an arrangement of keys, which are arranged on a panel of the keyboard in accordance with the embodiment 5 of the invention.

With reference to FIG. 11, twelve keys 501 to 512 used for inputting characters are arranged on a left portion of the keyboard, while other keys 521 to 530 as well as a space key 513 and an enter key 531 are arranged on a right portion of the keyboard. Specifically, the key 501 is used to input four alphanumeric characters of "K", "1", "G" and "F"; the key 502 is used to input "S", "2", "Z" and "J"; the key 503 is used to input "T", "3", "D" and "L"; the key 504 is used to input "N", "4", "NN" and "Q"; the key 505 is used to input "H", "5", "B" and "C"; the key 506 is used to input "A", "6", "M" and "X"; the key 507 is used to input "I", "7", "Y" and a comma ","; the key 508 is used to input "U", "8", "R" and a period "."; the key 509 is used to input "E", "9", "W" and a slash "f"; the key 510 is used to input a symbol "*"; the key 511 is used to input "O", "0", "P" and "V"; and the key 512 is used to input a symbol "#". In addition, there are provided four cursor keys, i.e., key 521 for "↑", key 522 for "↓", key 523 for "←" and key 524 for "→". Further, there are provided BS key 525, DL key 526, "1/2B" key 527 and "A/N" key 528 as well as 英 (alphabet)" key 529 and 大/小 (big/small)" key 530.

As for the key 501, for example, "K" is printed on an upper portion, "1" is printed on a middle portion, "G" is printed on a lower left portion, and "F" is printed on a lower right portion.

By pressing the key 501 once, it is possible to input "K" printed on the upper portion of the key 501. By repeatedly pressing the key 501 twice, it is possible to input "G" printed on the lower left portion of the key 501. In addition, when a human operator presses the key 501 just after pressing the key 510 representing the symbol "*", it is possible to input "1" printed on the middle portion of the key 501. Further, when the human operator presses the key 501 just after pressing the key 512 representing the symbol "#" it is possible to input "F" printed on the lower right portion of the key 501.

Each of the keys 502 to 509 and 511 is designed like the aforementioned key 501, wherein four alphanumeric characters are printed on upper, middle, lower left and lower right portions respectively. That is, the character printed on the upper portion is input by pressing the key once. The character printed on the lower left portion is input by repeatedly pressing the key twice. The character printed on the middle portion is input by pressing the key just after pressing the * key 510. The character printed on the lower right portion is input by pressing the key just after pressing the # key 512.

The keys 521, 522, 523 and 524 are used to move a cursor in upward, downward, leftward and rightward directions respectively on the screen. The BS key 525 is used to delete a character, which is displayed just before (left) a location of the cursor on the screen. The DL key 526 is used to delete a character being displayed on a location of the cursor on the screen. The 1/2B key 527 is used to switch over a type of an input character between a one-byte code character and a two-byte code character. In other words, the 1/2B key 527 is used to switch over a character input mode between an English input mode and a Japanese input mode. This key 527 is a so-called lock-type key by which the character input mode is switched over by every key depression. In other words, the key 527 has a same function of the keys normally employed in the keyboard of the personal computer. That is, the function of the key 527 is equivalent to the function of an ALT key and a 半角/全角 key used to change over display between a half-width character and a whole-width character, which are simultaneously depressed. The A/N key 528 is used to switch over an alphanumeric input mode between a numeral input mode and a alphabet input mode. The key 528 is a lock-type key by which the input mode is switched over every key depression.

The 英 key 529 is used to switch over display between a whole-width-character input mode and a half-width-character input mode during the Japanese input mode. The key 529 is a lock-type key by which the input mode is switched over every key depression. The key 529 is equivalent to a "F9" key normally used in the keyboard of the personal computer. Incidentally, the whole-width characters are normally used for Japanese characters (such as kana characters and Chinese characters), while the half-width characters are normally used for English characters corresponding to the alphabetic letters, for example.

The 大/小 key 530 is used to switch over a character input mode between a big character input mode and a small character input mode. The key 530 is a lock-type key by which the input mode is switched over every key depression. The key 530 is equivalent to a CAPS key normally used in the keyboard of the personal computer.

Incidentally, it is possible to adequately change and select types of consonant characters which are input by the single key-pressing operation and double key-pressing operation, and which are input by pressing the keys accompanied with the * key 510 and # key 512 respectively. In addition, it is possible to freely select types of prints being printed on the keys 510 and 512 respectively.

Next, a description will be given with respect to operation of the embodiment 5. The keyboard of the embodiment 5 shown in FIG. 11 is applicable to the aforementioned hardware configuration shown in FIG. 3, which is originally used for the embodiment 1. Like the embodiment 1, the operation of the embodiment 5 can be shown by the foregoing steps of the flowchart of FIG. 5. Different from the embodiment 1, the keyboard of the embodiment 5 is not equipped with the δ key 40. So, the embodiment 5 does not need the step S3 shown in FIG. 5.

As similar to the aforementioned embodiment 3, it is possible to actualize a character input method, which is made using the foregoing steps of the flowchart of FIG. 5 corresponding to the operation of the embodiment 5. As similar to the aforementioned embodiment 4, it is possible to actualize a storage medium (430) storing a program that controls an electronic device (400) to perform the steps of the operation of the embodiment 5.

Figures 12, 13:
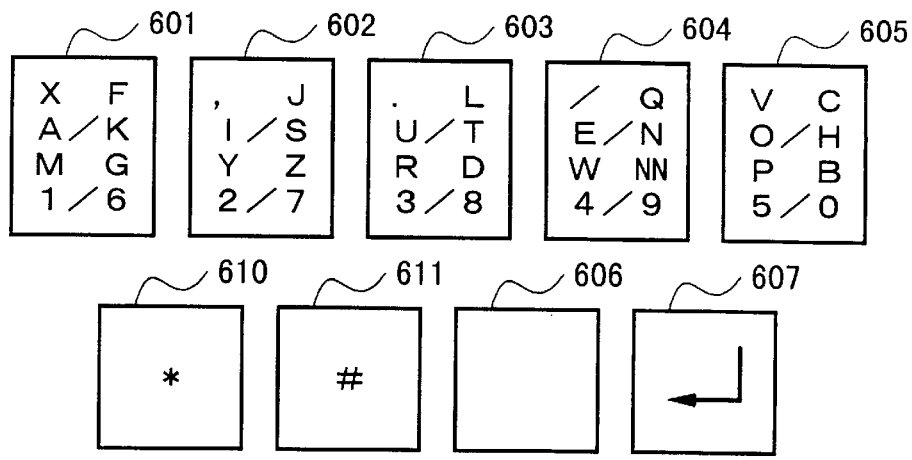
FIG. 12 is a schematic illustration showing an arrangement of keys, which are arranged on a panel of a keyboard in accordance with embodiment 6 of the invention.
FIG. 13 shows a comparison in key-pressing numbers between the QWERTY keyboard and the keyboards of the embodiments 5, 6 with respect to Japanese characters and English characters.
Figure 14:
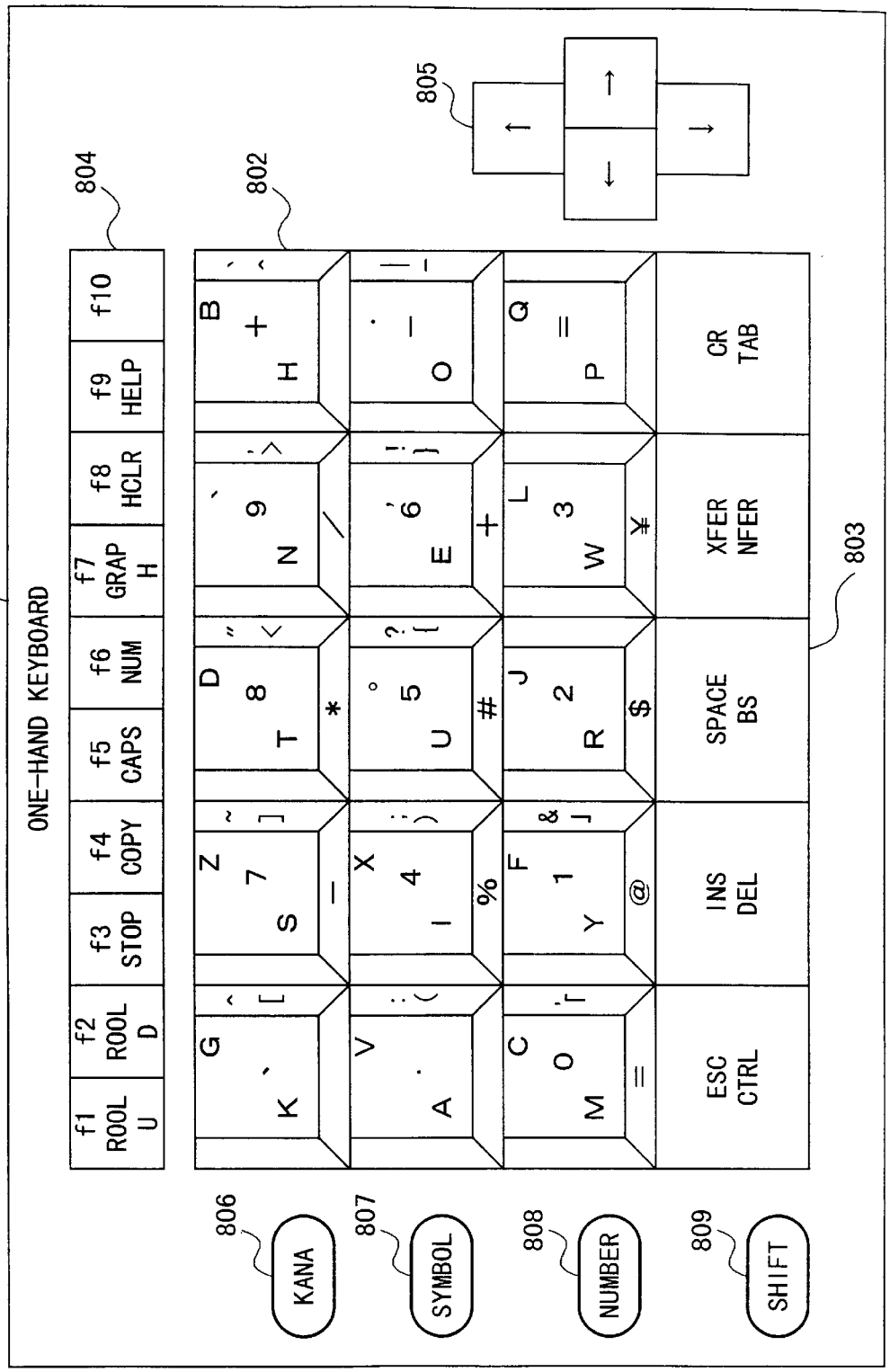
FIG. 14 is a schematic illustration showing a layout of keys being arranged on a panel of a one-hand keyboard.

Next, a description will be given with respect to embodiment 6 of the invention. FIG. 12 is a schematic illustration showing an arrangement of keys of a keyboard in accordance with the embodiment 6 of the invention.

With reference to FIG. 12, the keyboard of the embodiment 6 contains nine keys. Herein, each of keys 601 to 605 are used to input eight characters, wherein two of them are printed on each of four portions, i.e., upper, upper-middle, lower-middle and lower portions.

Specifically, the key 601 is used to input "X", "Y", "A/K", "M", "G" and "1/6". The key 602 is used to input a comma ",", , "I/S", "Y", "Z" and "2/7". The key 603 is used to input a period ".", "U/T", "R", "D" and "3/8". The key 604 is used to input "/", "Q", "E/N", "W", "NN" and "4/9". The key 605 is used to input "V", "C", "O/H", "P/B" and "5/0". In addition, the keyboard contains a space key 606, an enter key 607, a * key 610 and a # key 611.

As described above, the characters are printed on four portions of the key respectively. In the case of the key 601, for example, "X" is printed left on the upper portion while "F" is printed right on the upper portion; "A/K" is printed on the upper-middle portion; "M" is printed left on the lower-middle portion while "G" is printed right on the lower-middle portion; and "1/6" is printed on the lower portion.

"A" printed left on the upper-middle portion is input by pressing the key 601 once. "K" printed right on the upper-middle portion is input by repeatedly pressing the key 601 twice. When a human operator presses the key 601 just after pressing the * key 610, it is possible to input "M" printed left on the lower-middle portion. When the human operator presses the key 601 just after pressing the # key 611, it is possible to input "G" printed right on the lower-middle portion.

When a human operator presses the key 601 just after repeatedly pressing the * key 610 twice, it is possible to input "X" printed left on the upper portion. When the human operator presses the key 601 just after repeatedly pressing the # key 611 twice, it is possible to input "F" printed right on the upper portion.

When a human operator repeatedly presses the key 601 twice just after pressing the * key 610, it is possible to input "1" printed left on the lower portion. When the human operator repeatedly presses the key 601 twice just after pressing the # key 611, it is possible to input "6" printed right on the lower portion.

Incidentally, it is possible to adequately select types of consonant characters which are input by double key-pressing operations, and it is possible to adequately select types of characters which are input by pressing the keys accompanied with the * key 610 and # key 611. In addition, it is possible to freely select types of prints being printed on the keys 610 and 611.

Next, a description will be given with respect to operation of the embodiment 6.

The keyboard of the embodiment 6 is applicable to the foregoing hardware configuration shown in FIG. 3, which is originally used for the embodiment 1. As similar to the embodiment 1, the operation of the embodiment 6 can be actualized by the aforementioned flowchart of FIG. 5. Different from the embodiment 1, the keyboard of the embodiment 6 is not equipped with the δ key 40. So, the embodiment 6 does not need the step S3 shown in FIG. 5.

As similar to the embodiment 3, it is possible to actualize a character input method, which is made using the foregoing steps of the flowchart of FIG. 5 corresponding to the operation of the embodiment 6. As similar to the embodiment 4, it is possible to actualize a storage medium (430) storing a program that controls an electronic device (400) to perform the foregoing steps corresponding to the operation of the embodiment 6.

Next, a description will be given with respect to key-pressing numbers of the embodiments 5 and 6.

FIG. 13 shows a comparison in key-pressing numbers between the QWERTY keyboard and the keyboards of the embodiments 5, 6 with respect to Japanese characters and English characters.

The aforementioned calculations employed by the embodiments 1, 2 (see FIG. 9) are used to produce key-pressing numbers with respect to the embodiments 5 and 6, used for inputting Japanese characters, as follows:

With respect to the keyboard of the embodiment 5, a key-pressing number is "188". With respect to the keyboard of the embodiment 6, a key-pressing number is "230".

Using the above numbers, it is possible to calculate ratios (see FIG. 13) in key-pressing numbers with respect to the keyboards of the embodiments 5, 6 as compared with the QWERTY keyboard, as follows:

With respect to the keyboard of the embodiment 5 as compared with the QWERTY keyboard, the ratio is given by 188/165=1.14. With respect to the keyboard of the embodiment 6 as compared with the QWERTY keyboard, the ratio is given by 230/165=1.39.

Next, a description will be given with respect to English characters which are input using the keyboards respectively. The aforementioned calculations employed by the embodiments 1, 2 are used to produce key-pressing numbers with respect to the keyboards of the embodiments 5 and 6, used for inputting the English characters, as follows:

With respect to the keyboard of the embodiment 5, a key-pressing number is "131.8". With respect to the keyboard of the embodiment 6, a key-pressing number is "169.4".

Using the above numbers, it is possible to calculate ratios (see FIG. 13) in key-pressing numbers with respect to the keyboards of the embodiments 5, 6 as compared with the QWERTY keyboard, as follows:

With respect to the keyboard of the embodiment 5 as compared with the QWERTY keyboard, the ratio is given by 131.8/100=1.32. With respect to the keyboard of the embodiment 6 as compared with the QWERTY keyboard, the ratio is given by 169.4/100=1.69.

Figure 15:
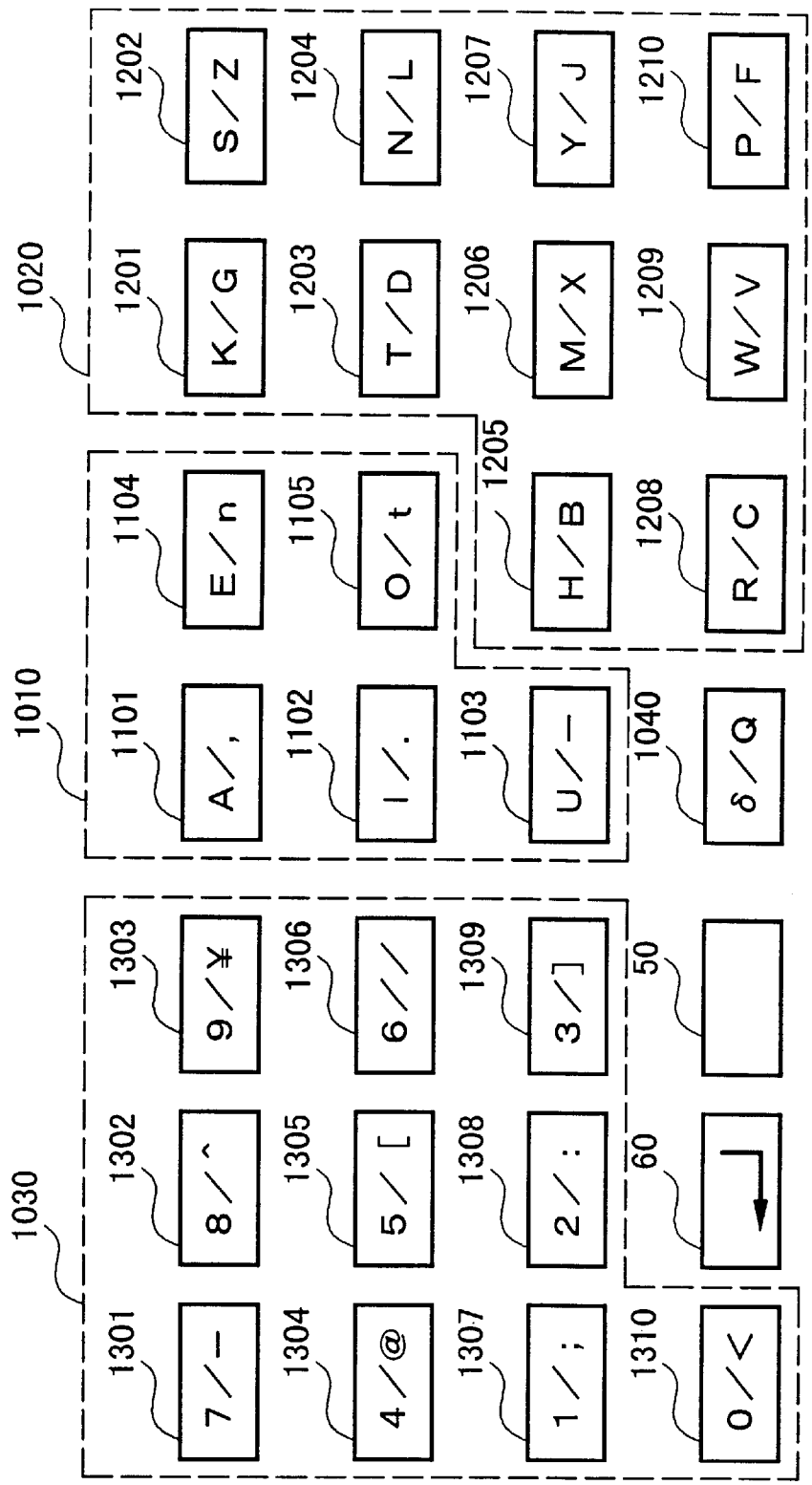
FIG. 15 is a schematic illustration showing an arrangement of keys, which are arranged on a panel of a keyboard in accordance with embodiment 7 of the invention.

Next, a description will be given with respect to embodiment 7 of the invention with reference to FIG. 15. FIG. 15 is a schematic illustration showing an arrangement of keys in a keyboard in accordance with embodiment 7 of the invention.

With reference to FIG. 15, the keyboard of the embodiment 7 contains a fourth group of keys "1010", a fifth group of keys "1020" and a six group of keys "1030" as well as a δ/Q key 1040, a space key 50 and an enter key 60.

The fourth group 1010 contains five keys 1101 to 1105, which are used to input a comma and a period in addition to the aforementioned five vowel characters "A", "I", "U", "E" and "O", which are described in connection with the embodiment 1 (i.e., first group of keys "10" shown in FIG. 1).

The fifth group of keys "1020" are used to input consonant characters as similar to the aforementioned second group of keys "20" shown in FIG. 1. As compared with the second group 20, the fifth group 1020 is reduced in number of keys by "2". That is, the fifth group 1020 consists of ten consonant keys 1201 to 1210, wherein the fifth group 1020 differs from the second group 20 by a N/L key 1204 and a P/F key 1210.

The sixth group of keys "1030" consists of ten keys 1301–1310, which are used to input numerals and symbols. Specifically, the sixth group 1030 contains "7/-" key 1301, "8/^" key 1302, "9/¥" key 1303, "4/@" key 1304, "5/[" key 1305, "6//" key 1306, "1/;" key 1307, "2/:" key 1308, "3/]"key 1309 and "0/<" key 1310.

Next, a description will be given with respect to functions and operations of the δ/Q key 1040.

Pressing the δ/Q key 1040 allows the "A/," key 1101 to input its right character, i.e., a comma ",". Similarly, pressing the δ/Q key 1040 allows the "I/." Key 1102 to input a period ".". Pressing the δ/Q key 1040 allows the "U/-" key 1103 to input a symbol "-" representing a long sound in Japanese. Pressing the δ/Q key 1040 allows the "E/n" key 1104 to input a character ん (i.e., n)" in Japanese. Pressing the δ/Q key 1040 allows the "O/t" key 1105 to input っ (i.e., double consonant)" in Japanese. Similarly, pressing the δ/Q key 1040 allows each of the keys belonging to the fifth group 1020 to input its right character. Specifically, pressing the δ/Q key 1040 allows the "K/G" key 1201 to input "G". It allows the "S/Z" key 1202 to input "Z". It allows the "T/D" key 1203 to input "D". It allows the "N/L" key 1204 to input "L". It allows the "H/B" key 1205 to input "B". It allows the "M/X" key 1206 to input "X". It allows the "Y/J" key 1207 to input "J". It allows the "R/C" key 1208 to input "C". It allows the "W/V" key 1209 to input "V". It allows the "P/F" key 1210 to input "F".

Similarly, pressing the δ/Q key 1040 allows each of the keys belonging to the sixth group 1030 to input its right symbol. Specifically, pressing the δ/Q key 1040 allows the "7/-" key 1301 to input a symbol "-". It allows the "8/A" key 1302 to input a symbol "^". It allows the "6/¥" key 1303 to input a symbol ¥. It allows the "4/@" key 1304 to input a symbol "@". It allows the "5/[" key 1305 to input a symbol "[". It allows the "6//" key 1306 to input a symbol "/". It allows the "1/;" key 1307 to input a semicolon ";". It allows the "2/:" key 1308 to input a colon ":". It allows the "3/]" key 1309 to input a symbol "]". It allows the "0/<" key 1310 to input a symbol "<".

When a human operator presses the δ/Q key 1040 subsequently to depression of the δ/Q key 1040, it is possible to input a consonant character "Q".

When a human operator presses each of the keys belonging to the fourth group 1010, fifth group 1020 and sixth group 1030 after depression of the δ/Q key 1040, it is possible to input the corresponding character or symbol.

Under the condition where the δ/Q key 1040 is not pressed, the keys 1101–1105 of the fourth group 1010 work as the vowel keys which are used to input five vowel characters in Japanese. In addition, under the condition where the δ/Q key 1040 is not pressed, the keys 1201–1210 of the fifth group 1020 work as the consonant keys which are used to input consonant characters K, S, T, N, H, M, Y, R, W and P respectively. Further, under the condition where the δ/Q key 1040 is not pressed, the keys 1301–1310 of the sixth group 1030 work as numeric keys which are used to input numerals 7, 8, 9, 4, 5, 6, 1, 2, 3 and 0 respectively.

Other keys of the embodiment 7 work as similar to ones of the embodiment 1, which a re described before.

Lastly, the embodiments of the invention have a variety of technical features and effects, which are summarized as follows:

(1) The keyboards of the invention are applicable to cellular phones. Because, the keyboard of the invention requires a small number of keys, which are approximately a half a number of keys used in the conventional QWERTY keyboard.

(2) The keyboards of the invention do not require a number of key-pressing operations so much. Because, the keyboard is designed in consideration of appearance frequencies (see FIGS. 9 and 13) of characters both Japanese and English. As for the keyboard of the embodiment 1, the key-pressing number increases by only 6% in inputting Japanese characters, while it increases by 12% in inputting English characters. As for the keyboard of the embodiment 2, the key-pressing number increases by 12% in inputting Japanese characters, while it increases by 11% in inputting English characters. As for the keyboard of the embodiment 5, the key-pressing number increases by 14% in inputting Japanese characters, while it increases by 39% in inputting English characters. As for the keyboard of the embodiment 6, the key-pressing number increases by 32% in inputting Japanese characters, while it increases by 69% in inputting English characters.

(3) It is possible to provide a distinction in inputting consonant characters. That is, operations to simply input the same character twice by pressing the same key twice can be distinguished from the double key-pressing operation which is applied to the key to input a voiced consonant character. Because, the invention provides a special measure for distinguishing between the operations for inputting the same character twice and the double key-pressing operation for inputting the voiced consonant character.

(4) The keyboards of the invention have good performability in operation. Because, the vowel keys and consonant keys are arranged at different portions of the keyboard in the embodiment 1 or 2, for example.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A character input system using a keyboard comprising:
    a first group of keys, each of which inputs a character thereof by a single key-pressing operation applied thereto; and
    a second group of keys, each of which inputs characters thereof by a single key-pressing operation and a double key-pressing operation respectively,
    wherein the first group of keys are arranged apart from the second group of keys on the keyboard.

2. A character input system using the keyboard according to claim 1 further comprising means for arbitrarily setting a time which is used to make a decision as to whether the character of the key belonging to the second group is defined by the single key-pressing operation or the double key-pressing operation.

3. A character input system using the keyboard according to claim 1 further comprising a specific key, by which when being pressed just after depression of the key of the second group, a double key-pressing operation is established for the key.

4. A character input system using the keyboard according to claim 1 further comprising a specific key, by which when being pressed just before depression of the key of the second group, a double key-pressing operation is established for the key.

5. A character input system using the keyboard according to claim 2 further comprising a specific key, by which when being pressed just after depression of the key of the second group, a double key-pressing operation is established for the key, or a specific key, by which when being pressed just before depression of the key of the second group, a double key-pressing operation is established for the key.

6. A character input system using the keyboard according to claim 5 wherein alphabetic letters corresponding to vowel characters are respectively assigned to the keys of the first group, while other alphabetic letters corresponding to consonant characters are respectively assigned to the keys of the second group.

7. A character input system using the keyboard according to claim 6 wherein an unvoiced consonant character expressed in a roman letter is assigned to the key of the second group and is input by a single key-pressing operation applied to the key, while a corresponding voiced consonant character expressed in a roman letter is assigned to the same key of the second group and is input by a double key-pressing operation applied to the key.

8. A character input system using the keyboard according to claim 6 where in the consonant characters are assigned to the keys of the second group in such a manner that each of the consonant characters whose appearance frequencies in English words and sentences are relatively high is input by a single key-pressing operation while each of the consonant characters whose appearance frequencies are relatively low is input by a double key-pressing operation.

9. A keyboard comprising:
    a plurality of vowel keys for inputting five vowel characters respectively;
    a plurality of consonant keys for inputting consonant characters in roman letters respectively, wherein two consonant characters are assigned to each consonant key so that the two consonant characters are input by a single key-pressing operation and a double key-pressing operation respectively and in such a way that a pair of an unvoiced consonant character and its corresponding voiced consonant character are assigned to a same consonant key; and a δ key for establishing a double key-pressing operation for the consonant key being pressed in connection with depression of the δ key, regardless of a prescribed time which is used to recognize the double key-pressing operation by which the consonant key is repeatedly pressed.

10. A keyboard according to claim 9 further comprising a key for inputting a comma and a period by a single key-pressing operation and a double key-pressing operation respectively.

* * * * *

UNITED STATES PATENT AND TRADEMARK OFFICE
CERTIFICATE OF CORRECTION

PATENT NO. : 6,231,252 B1 Page 1 of 1
DATED : May 15, 2001
INVENTOR(S) : Takuo Kitamura It is certified that error appears in the above-identified patent and that said Letters Patent is hereby corrected as shown below:

<u>Column 4,</u>
Lien 50, delete "NINN" insert -- N/NN --

Signed and Sealed this

Eleventh Day of December, 2001

Attest:

*Nicholas P. Godici*

NICHOLAS P. GODICI
*Attesting Officer*    *Acting Director of the United States Patent and Trademark Office*